United States Patent Office 3,503,730
Patented Mar. 31, 1970

3,503,730
SULFITE PRUNING AGENTS
Bogislav von Schmeling, Hamden, Rupert A. Covey, Wolcott, and Charles E. Crittendon, Hamden, Conn., assignors to Uniroyal, Inc., New York, N.Y., a corporation of New Jersey
No Drawing. Filed Dec. 22, 1967, Ser. No. 692,656
Int. Cl. A01n 9/14; C07c 137/00
U.S. Cl. 71—76
5 Claims

ABSTRACT OF THE DISCLOSURE

Aliphatic alkynyl and alkenyl sulfites achieve safe chemical regulation of plant growth by selectively killing meristematic tissue without harming matured foliage and stem tissue.

---

This invention relates to the use of aliphatic alkynyl and alkenyl sulfites for killing meristematic buds.

The manual removal of the stem apex, including a few apical leaves and flowers if present, to stimulate the development of auxiliary buds into lateral branches is an established process for the grower of ornamental plants. This process is known as pruning or pinching and requires hand labor. In order to reduce this expensive and time consuming labor it is obviously desirable to develop chemical means.

While it has been observed that the lower alkyl esters of the higher fatty acids exhibit chemical pruning activity they have suffered from several disadvantages. In accordance with this invention it has been discovered that alkynyl esters of the higher fatty acids have outstanding chemical activity with regard to killing meristematic buds and, additionally, have the following advantages over the lower alkyl esters of the higher fatty acids of the prior art:

(1) Optimum concentrations can be sprayed to runoff without being phytotoxic to the mature stem tissue, and mature leaves.
(2) Active at much lower concentrations.
(3) Easier to formulate.

The compounds of this invention may be used for killing meristematic buds on ornamental and agricultural herbaceous, semi-woody and woody plants such as chrysanthemum, cotton, azalea, apple and tobacco. Meristematic buds include both terminal and axillary buds. The selective killing of terminal buds is an application for which the chemicals of the invention are particularly useful.

The compounds of the invention have the formula:

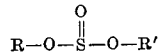

in which R is an alkyl, alkenyl, alkoxyalkyl, haloalkyl, or cycloalkyl radical of up to 18 carbon atoms and R' is alkynyl, haloalkynyl, alkenyl, or haloalkenyl radical of 3 to 9 carbon atoms.

These compounds are known compositions and examples of their preparations are described in U.S. Patents 3,179,684, 3,179,686, and in copending U.S. patent application Ser. No. 643,056, filed June 2, 1967 now U.S. Patent No. 3,428,734.

The chemicals of the present invention may be applied to plants, which term includes various plant parts such as seeds, flowers, fruits, vegetables, roots and foliage in various manners. Seeds may be treated directly with the chemical before planting, or seeds may be treated with the chemical by incorporating the chemical in the soil before or after planting the seeds. The chemicals may be applied to plants in an inert medium as a dust in admixture with a powdered solid carrier, such as the various mineral silicates, e.g., mica, talc, pyrophyllite and clays or as an aqueous composition. The chemicals may be applied in admixture with small amounts of surface-active wetting agents, which may be anionic, non-ionic, or cationic surface-active agents, generally as aqueous compositions. The chemicals may be dissolved in organic solvents such as acetone, benzene, or kerosene, and the solutions of the chemicals emulsified in water with the aid of surface-active agents. Such surface-active agents are well known and reference is made to U.S. Patent No. 2,547,724, columns 3 and 4, for detailed examples of the same. The chemicals of the invention may be admixed with powdered solid carriers, such as mineral silicates, together with a surface-active agent so that a wettable powder may be obtained which may be applied directly to plants, or which may be shaken up with water for application to the plants in that form.

The concentration of active chemical in the useful formulations may vary widely, e.g., from 1% to 95%. Generally, the active chemical in dispersions which are applied are from 0.05% to 6.0%. The amount per acre of active chemical applied may vary from 0.5 pound to 50 pounds depending on the plant being treated and other factors known to those skilled in the art.

The plants are prepared for chemical treatment by the following procedure:

Rooted cuttings of *Chrysanthemum morifolium* cv. Improved Indianapolis Yellow are planted in 12 oz. styrofoam pots in a sterilized soil mixture of one part soil, on part peat moss, and one part horticulture perlite. At planting and weekly thereafter, the plants are fertilized with 25-5-30 analysis fertilizer at the rate of one ounce per three gallons of water. For seven to ten days following planting, the plants are placed under a polyethylene "tent" and frequently syringed to provide conditions of both high temperature and high relative humidity, respectively. The potted plants are maintained under long-day conditions by the use of supplemental fluorescent light from five p.m. to nine p.m. and from five a.m. to seven a.m. daily. Ten days to two weeks after planting the established plants are ready to treat.

The compounds of the invention were formulated according to one of the following techniques:

ACETONE FORMULATION

One hundred ml. of a 25,000 p.p.m. spray solution are prepared by dissolving 2.5 grams of the selected compound in 20 ml. of acetone and two drops (60 mg.) of isooctyl phenyl polyethoxy ethanol (Triton X100) surface active wetting agent. Dilutions to 10,000, 4,000 and 2,000 p.p.m. are prepared by diluting the appropriate amount of the 25,000 p.p.m. solution with water to which isooctyl phenyl polyethoxy ethanol has been added at the rate of two drops per 100 ml.

EMULSIFIABLE CONCENTRATE FORMULATION

Two and one-half grams of the selected compound and 0.28 gram of isooctyl phenyl polyethoxy ethanol are combined to produce an emulsifiable concentrate, 90% of which is the active ingredient. Enough water is added to the 2.78 grams of emulsifiable concentrate to bring the total volume to 100 ml. This results in a 25,000 p.p.m. solution. Dilutions to 10,000, 4,000 and 2,000 p.p.m. are prepared by diluting the appropriate amount of the 25,000 p.p.m. solution with water to which isooctyl phenyl polyethoxy ethanol has been added at the rate of two drops per 100 ml.

The aqueous formulation is applied as a foliar spray until the plants are wet to run-off. The plants are allowed to dry and then placed in the greenhouse at a temperature of 65° F. minimum night temperature.

Within 12 to 24 hours following the application of optimum dosages and formulations of said compounds, the shoot apex, embryonic leaves and embryonic axillary meristems (hereinafter collectively referred to as the terminal meristem) turn black and are very flaccid.

Within the next few days this same dead tissue turns grayish and a constriction appears on the stem at the proximal limit of the killed tissue. At optimum concentrations the compounds are non-phytotoxic to matured axillary meristems, leaves, and stem tissue. This process of killing the terminal meristem with aqueous emulsions of the compounds of the mentioned type will hereinafter be referred to as chemical pruning.

At concentrations less than optimum the terminal meristem is not completely killed and therefore maintains apical dominance over the axillary meristems. At concentrations in excess of optimum both the terminal and axillary meristems may be killed without causing damage to foliage and stem tissue.

With other compounds, concentrations in excess of optimum may kill the terminal meristem and by phytotoxic to mature leaves but may not kill the axillary meristems. Concentrations in excess of optimum of still other compounds may kill the terminal and axillary meristems and be phytotoxic to the mature leaves.

The following table shows the minimum concentration of the compounds required to achieve chemical pruning activity. The acetone formulation was used except where otherwise indicated.

TABLE I

| Compound | Minimum pruning dosage (p.p.m.) | Phytotoxicity rating |
|---|---|---|
| Propargyl hexyl sulfite | 5,000 | 4 |
| Propargyl heptyl sulfite | 3,000 | (²) |
| Propargyl 2,3-dimethylpentyl sulfite | 7,000 | 0 |
| Propargyl octyl sulfite | 4,000 | 1 |
| Propargyl 2-ethylhexyl sulfite | 6,000 | 1 |
| Propargyl "iso" octyl sulfite | 4,000 | 1 |
| Propargyl 2,2,4-trimethylpentyl sulfite | 10,000 | 1 |
| Propargyl 2-octyl sulfite | ³ 5,000 | 0 |
| Propargyl nonyl sulfite | 4,000 | 1 |
| Propargyl 3-methyl-4-octyl sulfite | 10,000 | ¹ 0 |
| Propargyl decyl sulfite | 7,000 | 3 |
| Propargyl 2-methyl-3-nonyl sulfite | 6,000 | ¹ 0 |
| Propargyl 2-methyl-4-nonyl sulfite | ³ 5,000 | ¹ 0 |
| Propargyl 3-methyl-4-nonyl sulfite | 5,000 | ¹ 0 |
| Propargyl 1-cyclohexylbutyl sulfite | ³ 4,000 | ¹ 0 |
| Propargyl 5-ethyl-2-nonyl sulfite | 25,000 | 2 |
| Propargyl 2-butyloctyl sulfite | ³ ~27,000 | 2 |
| Propargyl 2,6,8-trimethyl-4-nonyl sulfite | ³ ~27,000 | 1 |
| Propargyl 2-cyclohexylcyclohexyl sulfite | 25,000 | 3 |
| Propargyl tridecyl sulfite | ³ ~27,000 | 1 |
| Propargyl "iso" tridecyl sulfite | ³ ~27,000 | 0 |
| Propargyl tetradecyl sulfite | ³ ~27,000 | 1 |
| Propargyl 2-chlorocyclohexyl sulfite | 9,000 | 4 |
| 1-(2-butynyl) octyl sulfite | 7,000 | ¹ 2 |
| 1-(4-chloro-2-butynyl) hexyl sulfite | 10,000 | 3 |
| 1-(4-chloro-2-butynyl) octyl sulfite | 8,000 | 4 |
| 1-(4-chloro-2-butynyl) decyl sulfite | 10,000 | 1 |
| 1-(4-chloro-2-butynyl) 2-chloroethyl sulfite | 15,000 | 3 |
| 1-(2-chloro-2-propenyl) octyl sulfite | 5,000 | ¹ 3 |
| 2-(1-bromo-3-butenyl) octyl sulfite | 7,000 | 3 |
| Propargyl "iso" decoxyethyl sulfite | 6,000 | 1 |
| Propargyl butoxyethyl sulfite | 8,000 | 3 |
| Propargyl hexoxyethyl sulfite | ³ 3,000 | ¹ 1 |
| Propargyl 3-butoxy-1-chloro-2-propyl sulfite | ³ 8,000 | ¹ 2 |

¹ Axillary meristems killed.
² Girdled at soil line.
³ Emulsifiable concentrate formulation employed.
Phytotoxicity ratings—0=None, 1=Trace, 2=Slight, 3=Moderate, 4=Severe.

Having thus described our invention, what we claim and desire to protect by Letters Patent is:

1. A method of killing meristematic buds which comprises applying to said buds in a concentration and amount effective to kill the buds a composition comprising a compound selected from the group consisting of:

propargyl 2,3-dimethylpentyl sulfite;
propargyl octyl sulfite;
propargyl 2-ethylhexyl sulfite;
propargyl iso octyl sulfite;
propargyl 2,2,4-trimethylpentyl sulfite;
propargyl 2-octyl sulfite;
propargyl nonyl sulfite;
propargyl 3-methyl-4-octyl sulfite;
propargyl 2-methyl-3-nonyl sulfite;
propargyl 2-methyl-4-nonyl sulfite;
propargyl 3-methyl-4-nonyl sulfite;
propargyl 1-cyclohexylbutyl sulfite;
propargyl 2,6,8-trimethyl-4-nonyl sulfite;
propargyl tridecyl sulfite;
propargyl iso tridecyl sulfite;
propargyl tetradecyl sulfite.

2. The method of claim 1 wherein said compound is propargyl 2-octyl sulfite.

3. The method of claim 1 wherein said compound is propargyl 2,3-dimethylpentyl sulfite.

4. The method of claim 1 wherein said compound is propargyl 1-cyclohexylbutyl sulfite.

5. The method of claim 1 wherein said compound is propargyl 2-methyl-3-nonyl sulfite.

References Cited
UNITED STATES PATENTS

| | | | |
|---|---|---|---|
| 2,523,227 | 9/1950 | Mullison | 71—76 |
| 2,885,278 | 5/1959 | Brack | 71—103 |
| 3,025,328 | 3/1962 | Carlson | 71—103 |
| 3,179,682 | 4/1965 | Covey et al. | 260—456 |
| 3,179,683 | 4/1965 | Hubbard et al. | 260—456 |
| 3,179,684 | 4/1965 | Covey et al. | 260—456 |
| 3,179,685 | 4/1965 | Hubbard et al. | 260—456 |
| 3,179,686 | 4/1965 | Covey et al. | 71—103 |
| 3,179,687 | 4/1965 | Covey et al. | 71—103 |
| 2,654,667 | 10/1953 | Goodhue et al. | 71—72 |

LEWIS GOTTS, Primary Examiner

G. HOLLRAH, Assistant Examiner

U.S. Cl. X.R.

71—103, 118; 260—456